United States Patent
Mizuguchi

(10) Patent No.: US 10,536,593 B2
(45) Date of Patent: Jan. 14, 2020

(54) SETTING DEVICE, IMAGE FORMING APPARATUS INCLUDING THE SETTING DEVICE AND CLEAR-COAT SETTING METHOD

(71) Applicant: Sharp Kabushiki Kaisha, Sakai, Osaka (JP)

(72) Inventor: Yukinori Mizuguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 55 days.

(21) Appl. No.: 15/860,797

(22) Filed: Jan. 3, 2018

(65) Prior Publication Data

US 2018/0131816 A1    May 10, 2018

Related U.S. Application Data

(63) Continuation of application No. 15/040,094, filed on Feb. 10, 2016, now Pat. No. 9,894,225, which is a continuation of application No. 14/228,302, filed on Mar. 28, 2014, now Pat. No. 9,291,978.

(30) Foreign Application Priority Data

May 30, 2013 (JP) ................................. 2013-114182

(51) Int. Cl.
*H04N 1/00* (2006.01)
*G03G 15/00* (2006.01)
*H04N 1/23* (2006.01)

(52) U.S. Cl.
CPC ....... *H04N 1/0044* (2013.01); *G03G 15/6585* (2013.01); *H04N 1/00411* (2013.01); *H04N 1/2338* (2013.01); *H04N 1/2369* (2013.01); *G03G 2215/00801* (2013.01); *H04N 2201/0094* (2013.01)

(58) Field of Classification Search
None
See application file for complete search history.

(56) References Cited

U.S. PATENT DOCUMENTS

2010/0007902 A1   1/2010   Kikuchi
2010/0271666 A1   10/2010  Kimura
(Continued)

FOREIGN PATENT DOCUMENTS

| CN | 101625630 A | 1/2010 |
| CN | 101873396 A | 10/2010 |
| CN | 102665021 A | 9/2012 |

OTHER PUBLICATIONS

Mizuguchi, "Setting Device, Image Forming Apparatus Including the Setting Device and Clear-Coat Setting Method", U.S. Appl. No. 15/040,094, filed Feb. 10, 2016.

*Primary Examiner* — David M. Gray
*Assistant Examiner* — Geoffrey T Evans
(74) *Attorney, Agent, or Firm* — Keating & Bennett, LLP

(57) ABSTRACT

A setting device sets a print page to be clear-coated. When print data is obtained, the setting device displays a preview of a print page image represented by the print data (step S1040). The setting device further receives a designation for a print page image of which preview is displayed, and sets a print page corresponding to the print page image of which designation has been received as a print page to be clear-coated (step S1050).

8 Claims, 8 Drawing Sheets

(56) References Cited

U.S. PATENT DOCUMENTS

| | | | |
|---|---|---|---|
| 2010/0284047 A1* | 11/2010 | Ota | H04N 1/00795 358/475 |
| 2012/0002232 A1* | 1/2012 | Inui | H04N 1/00 358/1.13 |
| 2012/0092707 A1 | 4/2012 | Saito | |
| 2013/0101303 A1* | 4/2013 | Kasai | G03G 15/205 399/45 |

* cited by examiner

SETTING DEVICE, IMAGE FORMING APPARATUS INCLUDING THE SETTING DEVICE AND CLEAR-COAT SETTING METHOD

CROSS-REFERENCE TO RELATED APPLICATION

This nonprovisional application claims priority under 35 U.S.C. § 119(a) on Patent Application No. 2013-114182 filed in Japan on May 30, 2013, the entire contents of which are hereby incorporated by reference.

BACKGROUND OF THE INVENTION

Field of the Invention

The present invention relates to a setting device for setting a print page to be clear-coated, an image forming apparatus provided with the setting device, and a clear-coat setting method for setting the print page to be clear-coated.

Description of the Background Art

Recently, demand for higher image quality is increasing for full-color image forming apparatuses based on electrophotography. With such a demand, an image forming apparatus providing clear-coating has been proposed, which forms a high-quality image on a sheet of recording paper and, thereafter, further forms a toner image that becomes transparent after fixing on the sheet, for the purpose of realizing glossy finish.

By way of example, Japanese Patent Laying-Open No. 2007-322819 (hereinafter referred to as '819 Reference) discloses an image forming system including a color image forming apparatus forming a plurality of color toner images, a clear-coat image forming apparatus forming a clear-coated image using a clear toner (clear coating material) that becomes transparent after fixing, connected as a subsequent stage to the color image forming apparatus, and a book binding machine connected thereto as a further subsequent stage. The color image forming apparatus and the clear-coat image forming apparatus together form a clear-coated image at a sheet folding position, when a folding mode of the book binding machine is designated.

Generally, a user wants to clear-coat various pages such as pages with photographs or pictures, not only the front cover and the folding position of the innermost page. In the image forming system of '819 Reference, though it is possible to form a clear-coated image at the folding position of a sheet, if the user wishes to have any page he/she likes clear-coated, it is necessary for the user to grasp beforehand which pages are to be clear-coated and to set clear-coating page by page. Therefore, setting of pages to be clear-coated is very troublesome.

SUMMARY OF THE INVENTION

Therefore, it is desirable to provide a setting device allowing easy setting of pages to be clear-coated, an image forming apparatus including the setting device and a method of setting clear-coating.

According to a first aspect, the present invention provides a setting device setting a print page to be clear-coated. The setting device includes: a display section displaying a preview of a print page image represented by print data; a receiving section receiving a designation for a print page image displayed on the display section; and a setting section setting a print page corresponding to the print page image of which designation has been received by the receiving section, as a print page to be clear-coated.

The setting device displays a preview of a print page image represented by print data. The setting device further receives a designation to the print page images displayed as previews, and sets the print page or pages corresponding to the designated print page image or images as the print page or pages to be clear-coated. The pages to be clear-coated are often limited, for example, to front cover, back cover, and pages having photographs or pictures thereon. By the present setting device, it is possible for the user to set a page to be clear-coated while checking print data images using preview displays. Therefore, only the suitable pages, such as the front cover, back cover and the pages having photographs or pictures thereon can easily be set as the pages to be clear-coated.

Preferably, the display section includes a display unit displaying a preview of a specific print page image among a plurality of print page images represented by the print data. By way of example, if only the specific print pages (specific print page images) that are highly likely to be clear-coated are displayed as previews, it becomes unnecessary for the user to check pages that are less likely to be clear-coated. In other words, checking of pages not worth considering becomes unnecessary. This efficiently saves time and trouble when setting pages to be clear-coated.

More preferably, the setting device further includes a designating unit designating in advance a specific print page image among a plurality of print page images represented by the print data. Thus, it is possible to set specific print pages (specific print page images) that are highly likely to be clear-coated as the pages to be clear-coated by default. This more efficiently saves time and trouble when setting pages to be clear-coated.

More preferably, the specific print page image includes at least one of a page image corresponding to a front cover, a page image corresponding to a back cover, a page image having a photograph put thereon and a page image having a picture put thereon. It is highly likely that these pages are clear-coated. Therefore, if the specific print page images include these pages, it becomes possible to more efficiently save time and trouble when setting pages to be clear-coated.

More preferably, the display unit includes a unit for displaying a preview of at least one of a page image corresponding to a front cover, a page image corresponding to a back cover, a page image having a photograph put thereon and a page image having a picture put thereon, as the specific print page image.

More preferably, the designating unit includes a unit for designating at least one of a page image corresponding to a front cover, a page image corresponding to a back cover, a page image having a photograph put thereon and a page image having a picture put thereon, as the specific print page image.

More preferably, the print data includes data of a first print page and data of a second print page related to the first print page, and the display section includes a display unit displaying previews of the first and second print page images represented by the print data. The setting device further includes a unit for designating, in response to designation of the first print page image by a user, the second print page image related to the first print page image.

By way of example, the front cover and the back cover are related to each other and, therefore, if the front cover is set as the page to be clear-coated, the back cover is automatically set as the page to be clear-coated. Thus, by setting one page (for example, front cover) as the page to be clear-coated, the related page (for example, back cover) can automatically be set as the page to be clear-coated. Further, if a photograph or a picture extends over a plurality of pages, these consecutive pages are related to each other. In such a situation also, by setting one of these pages as the page to be clear-coated, the remaining pages can also be set as the pages to be clear-coated. Thus, the time and trouble when setting the pages to be clear-coated can efficiently be saved and, in addition, the pages to be clear-coated can surely be set as the pages to be clear-coated. Thus, every single page to be clear-coated can be clear-coated without fail.

According to a second aspect, the present invention provides an image forming apparatus, including: an image reading device reading a document image to be printed; the setting device according to the first aspect described above for setting a print page to be clear-coated, using print data read by the image reading device; and a clear coat unit for clear-coating the print page set by the setting device.

According to a third aspect, the present invention provides a clear-coat setting method for setting a print page to be clear-coated, including the steps of: displaying a preview of a print page image represented by print data; receiving designation for a print page image of which preview is displayed; and setting a print page corresponding to the designated print page image as a print page to be clear-coated.

As described above, by the present invention, a setting device allowing easy setting of pages to be clear-coated, an image forming apparatus including the setting device and a method of setting clear-coating can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
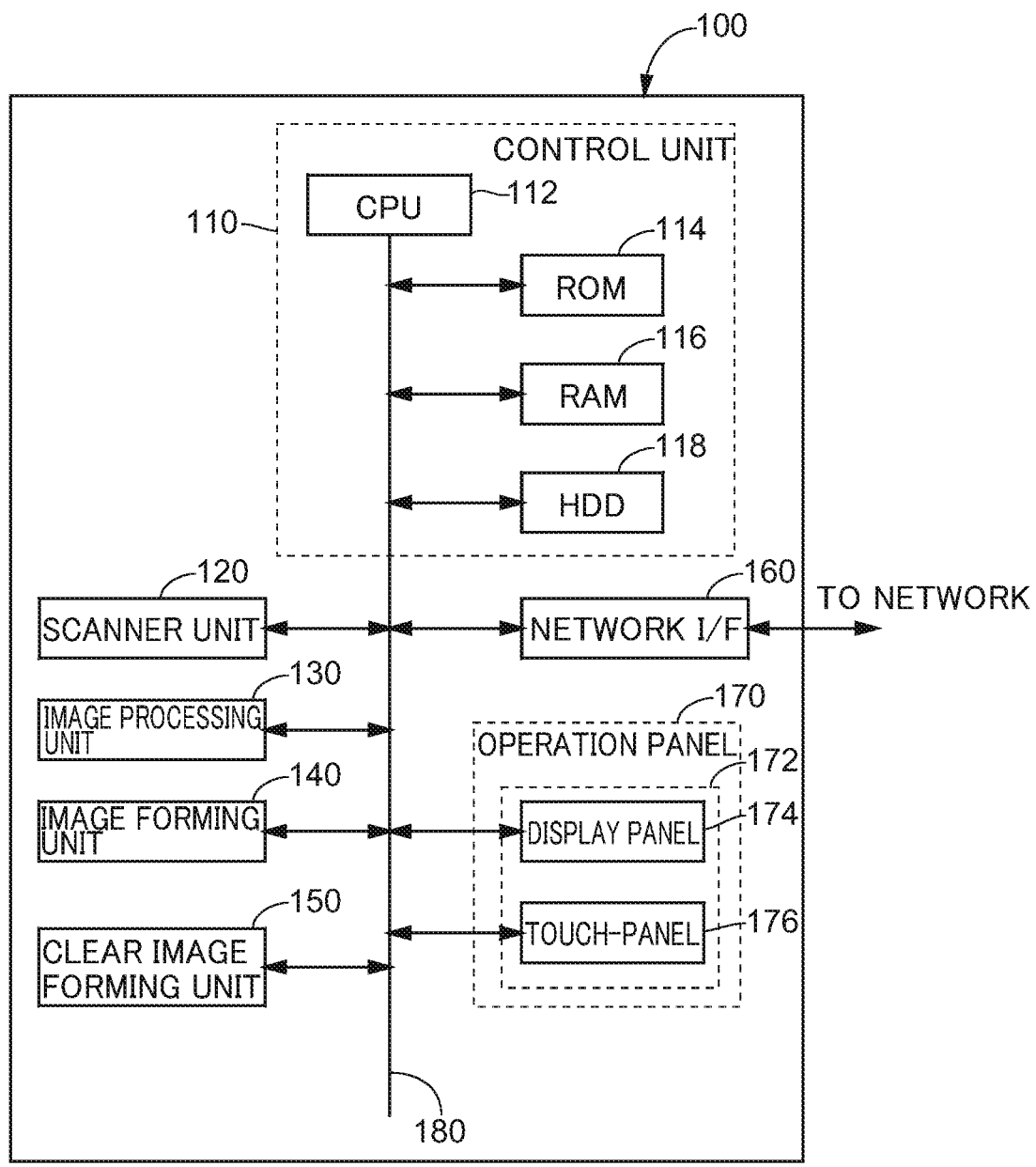
FIG. 1 is a control block diagram showing a hardware configuration of the image forming apparatus in accordance with an embodiment of the present invention.

In the embodiments below, the same components are denoted by the same reference characters. Their functions and names are also the same. Therefore, detailed description thereof will not be repeated.

Referring to FIG. 1, an image forming apparatus 100 in accordance with an embodiment of the present invention is, for example, an MFP (Multifunction Peripheral) having copy function, scanner function and printer function. Image forming apparatus 100 has a so-called laser printing function (electrophotography), using a laser beam for exposure. It may have a different type printing function. Image forming apparatus 100 has a function of providing clear-coating on a sheet of recording paper, which is a paper medium, after an image is formed on the sheet of recording paper.

In image forming apparatus 100, a document image is read (scanned) and print data (document data) is obtained, and then the image represented by the thus obtained print data is displayed as a preview image, on page-by-page basis. Further, in image forming apparatus 100, the obtained print data is subjected to area separation process, so that image areas (hereinafter also referred to as "photo area" or "picture area") on the image represented by the print data are automatically discriminated. Thus, image forming apparatus 100 discriminates a page or pages having a photograph or a picture put thereon, among print pages included in the print data. Image forming apparatus 100 allows preview display of only the page or pages having a photograph or picture put thereon. If a user designates a desired page on the preview screen image, for example, image forming apparatus 100 sets the designated page as the page to be clear-coated. Upon reception of an instruction to start printing, image forming apparatus 100 prints the image on a sheet of recording paper based on the print data, and clear-coats the entire surface of the set page.

[Hardware Configuration]

<<Image Forming Apparatus 100>>

Referring to FIG. 1, image forming apparatus 100 in accordance with the present embodiment includes a control unit 110, a scanner unit 120, an image processing unit 130, an image forming unit 140, a clear image forming unit 150, a network interface (hereinafter "interface" will be denoted as "I/F") 160 and an operation panel 170.

Control unit 110 is substantially a computer, including a CPU (Central Processing Unit) 112, an ROM (Read Only Memory) 114, an RAM (Random Access Memory) 116 and a HDD (Hard Disk Drive) 118. CPU 112 is connected to a bus line 180, and ROM 114, RAM 116 and HDD 118 are electrically connected to bus line 180. CPU 112 executes various computer programs in accordance with instructions from, for example, operation panel 170, to realize desired processes including operations of various units of image forming apparatus 100 and communication with external equipment such as an information processing apparatus (not shown). The various computer programs mentioned above are stored in advance in ROM 114 or HDD 118 and when a desired process is executed, the program is read from ROM 114 or HDD 118 and transferred to RAM 116. CPU 112 reads and interprets program instructions from an address in RAM 116 designated by a value stored in a register called a program counter, not shown, in CPU 112. Further, CPU 112 reads data necessary for computation from an address designated by the read instruction, and executes the computation on the data in accordance with the instruction. The results of execution are also stored in an address designated by the instruction, such as HDD 118, RAM 116 or a register in CPU 112.

A computer program for realizing general operations of image forming apparatus 100 is stored in HDD 118. The computer program is provided from an information processing apparatus or the like, through a network and network I/F 160. The computer program may be provided by a storage medium such as a DVD recording the computer program. Specifically, a DVD as the recording medium of the computer program may be loaded to a DVD drive (not shown) built-in in image forming apparatus 100 and the computer program may be read from the DVD and installed to HDD 118. HDD 118 also stores various data including print data (image data).

To bus line 180, scanner unit 120, image processing unit 130, image forming unit 140, clear image forming unit 150, network I/F 160 and operation panel 170 are electrically connected.

Scanner unit 120 is a device for reading document images and it includes a document detection sensor and a CCD (Charge-Coupled Device) line sensor (both not shown). When a document is placed on a platen (not shown) manually by a user or by an automatic document feeder (not shown), the document detection sensor irradiates image surface of the document with light from a light source (not shown), and causes a reflected light image to be formed on the CCD line sensor. The CCD line sensor successively performs photoelectric conversion of the thus formed reflected light image to provide image data, and the image data is output to image processing unit 130. Specifically, at the time of copying or scanning a document, scanner unit 120 reads image information by means of the document detection sensor from the document placed on the platen, converts the read image information to electric signals by means of the CCD line sensor, and outputs the resulting image data to image processing unit 130.

Image processing unit 130 includes an MPU (Micro Processing Unit, not shown). Image processing unit 130 performs various processing including prescribed image processing such as rasterizing, on the image data received from scanner unit 120 or from an information processing apparatus to form print data of prescribed tone, and outputs the data to image forming unit 140.

Image forming unit 140 is for color printing or monochrome printing the image representing the print data, and it includes, for example, a photoreceptor drum, a charger, a laser scanning unit (LSU), a developer, a transfer device, a cleaning device, a fixing device and a neutralizer. Image forming unit 140 is provided, for example, with a conveyer path and a sheet of recording paper fed from a paper feed unit (not shown) is conveyed along the conveyer path. The paper feed unit draws out sheets of recording paper contained in a paper cassette (not shown) or placed on a manual feed tray one by one and feeds the sheets to the conveyer path of image forming unit 140. As the sheet of paper is fed along the conveyer path of image forming unit 140, the sheet passes between the photoreceptor drum and the transfer device, and further through the fixing device, whereby printing is done on the sheet of recording paper.

The photoreceptor drum rotates in one direction. Its surface is cleaned by the cleaning device and the neutralizer and thereafter, uniformly charged by the charger. The laser scanning unit modulates a laser beam based on the print data as the object of printing, and by repeatedly scanning the surface of photoreceptor drum with the laser beam in a main scanning direction, forms an electrostatic latent image on the surface of photoreceptor drum. The developer supplies toner to the surface of photoreceptor drum to develop the electrostatic latent image and forms a toner image on the surface of photoreceptor drum. The transfer device transfers the toner image on the surface of photoreceptor drum to the sheet of recording paper passing between the transfer device and the photoreceptor drum.

The fixing device includes a heating roller for heating the sheet of recording paper and a pressure roller for pressing the sheet of recording paper. The sheet of recording paper is heated by the heating roller and pressed by the pressure roller, so that the toner image that has been transferred to the sheet of recording paper is fixed on the sheet of recording paper. The sheet of recording paper discharged from the fixing device (printed sheet) is discharged to a paper discharge tray. If clear-coating of the sheet of recording paper is set, the (printed) sheet of recording paper discharged from the fixing device is fed to a clear image forming unit 150.

Clear image forming unit 150 forms a clear image on the printed sheet of paper fed from image forming unit 140, based on print data for clear-coating. Clear image forming unit 150 includes a photoreceptor drum, a charger, a laser scanning unit (LSU), a developer, a transfer device, a cleaning device, a fixing device and a neutralizer. Different from image forming unit 140, in clear image forming unit 150, the developer contains clear toner. Specifically, in clear image forming unit 150, clear toner that is transparent at least after fixing is used as clear-coating material. The sheet of recording paper clear-coated by clear image forming unit 150 is discharged to the paper discharge tray. In clear image forming unit 150, configurations of the photoreceptor drum, the charger, the laser scanning unit (LSU), the developer, the transfer device, the cleaning device, the fixing device and the neutralizer are the same as those of image forming unit 140. Therefore, detailed description thereof will not be repeated.

Network I/F 160 provides an interface with a network. Image forming apparatus 100 is capable of data communication in accordance with a prescribed communication protocol with an information processing apparatus or the like on the network through network I/F 160. Image forming apparatus 100 is capable of receiving instruction signals instructing execution of various processes such as a print job, from an information processing apparatus through network I/F 160.

Operation panel 170 includes a touch-panel display 172. Touch-panel display 172 is a touch-panel integrated type liquid crystal display device, formed by providing touch-panel 176 on display panel 174. Display panel 174 presents various pieces of information related to the state of image forming apparatus 100 and states of various processes to the user. Touch-panel display 172 also provides an interactive operation interface (user interface) to the user. The interactive operation interface receives a user instruction related to the overall operation of image forming apparatus 100 through touch-panel 176, displays the contents of instruction on display panel 174, and outputs a control signal in accordance with the instruction to control unit 110 or to the MPU of image processing unit 130. Touch-panel display 172 also provides preview display of images represented by the print data.

[Software Configuration]

Figure 2:
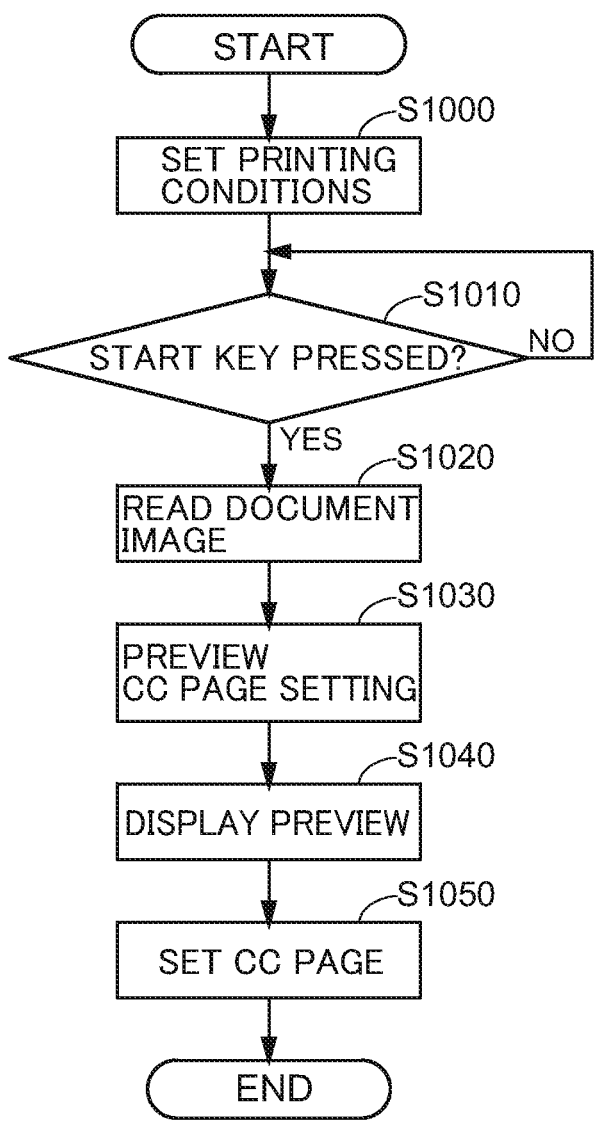
FIG. 2 is a flowchart representing a control structure of a program executed by the image forming apparatus shown in FIG. 1.

Referring to FIG. 2, the control structure of a computer program executed by image forming apparatus 100 for setting a page to be clear-coated will be described. In the following, an example of copying and printing a document will be described. The program is activated when the function of executing clear-coat is selected in a copy-print mode.

The program includes a step S1000 of setting printing conditions; a step S1010 executed following step S1000, of determining whether or not a start key (not shown) instructing start of copying is pressed, and waiting until the start key is pressed; and a step S1020, executed if it is determined at step S1010 that the start key is pressed, of reading a document image.

At step 1000, by way of example, in accordance with a user instruction, setting similar to those for general copy-printing is conducted. Setting of printing conditions includes, for example, method of printing (saddle stitch, duplex printing, N-UP (collective printing) etc.), paper type and the number of copies.

At step S1020, all pages of the document to be copied and printed are read by scanner unit 120 and the document image is converted to electronic data.

The program further includes a step S1030, executed following step S1020, of preview CC (Clear-Coat) page setting.

At step S1030, setting of pages to be previewed, default setting of pages to be clear-coated, and setting of method of setting pages to be clear-coated are conducted. At step S1030, control unit 110 first displays a setting screen image 200 shown in FIG. 3 on touch-panel display 172.

Figure 3:
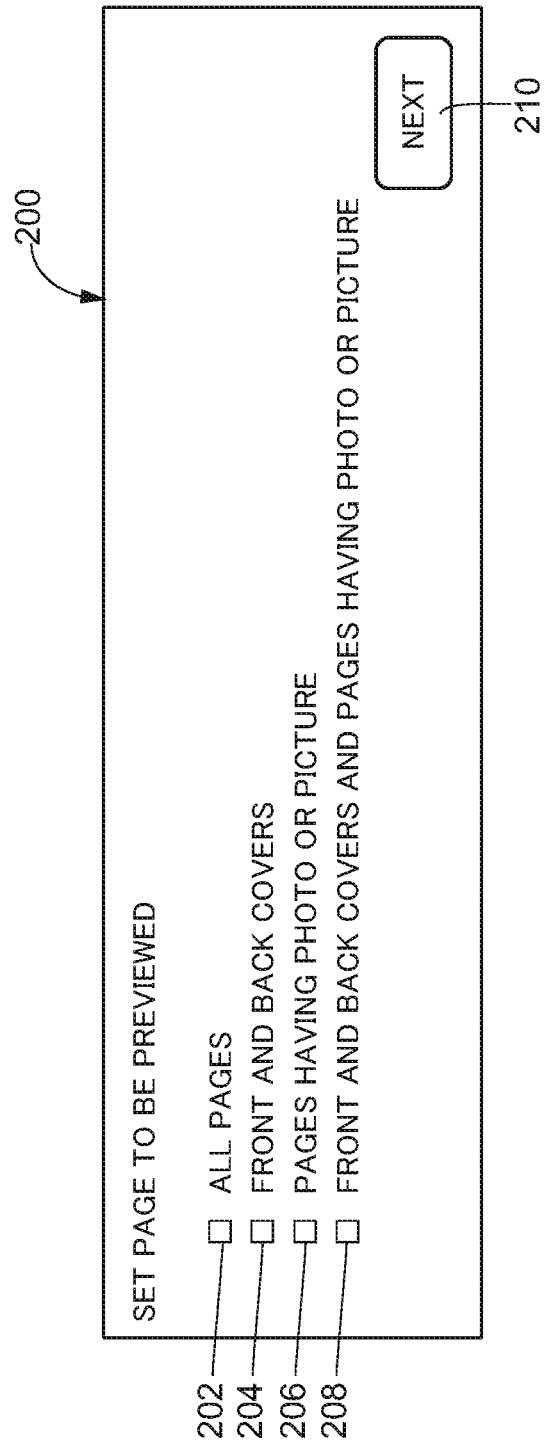
FIG. 3 shows an example of a setting screen image (UI) for setting a page of which preview is to be displayed.

Referring to FIG. 3, setting screen image 200 includes four check boxes 202 to 208 and "NEXT" key 210 to proceed to the next step of processing. When check box 202 is checked by an operation by the user, all pages are set as the pages to be previewed. When check box 204 is checked by an operation by the user, the front cover page (first page) and the back cover page (last page) are set as the pages to be previewed. When check box 206 is checked by an operation by the user, a page or pages having a photograph or picture thereon are set as pages to be previewed. When check box 208 is checked by an operation by the user, the front and back cover pages and a page or pages having a photograph or picture thereon are set as pages to be previewed. On setting screen image 200, it is possible to select any one of the four check boxes 202 to 208. By such a setting, previews of only the pages that may possibly be clear-coated by the user are displayed. Since previews are displayed in this manner, wasteful confirmation of pages (pages that are determined not to be clear-coated) becomes unnecessary. This saves time and trouble. When the user operates "NEXT" key 210, the screen image makes a transition to a setting screen image 300 shown in FIG. 4.

Figure 4:
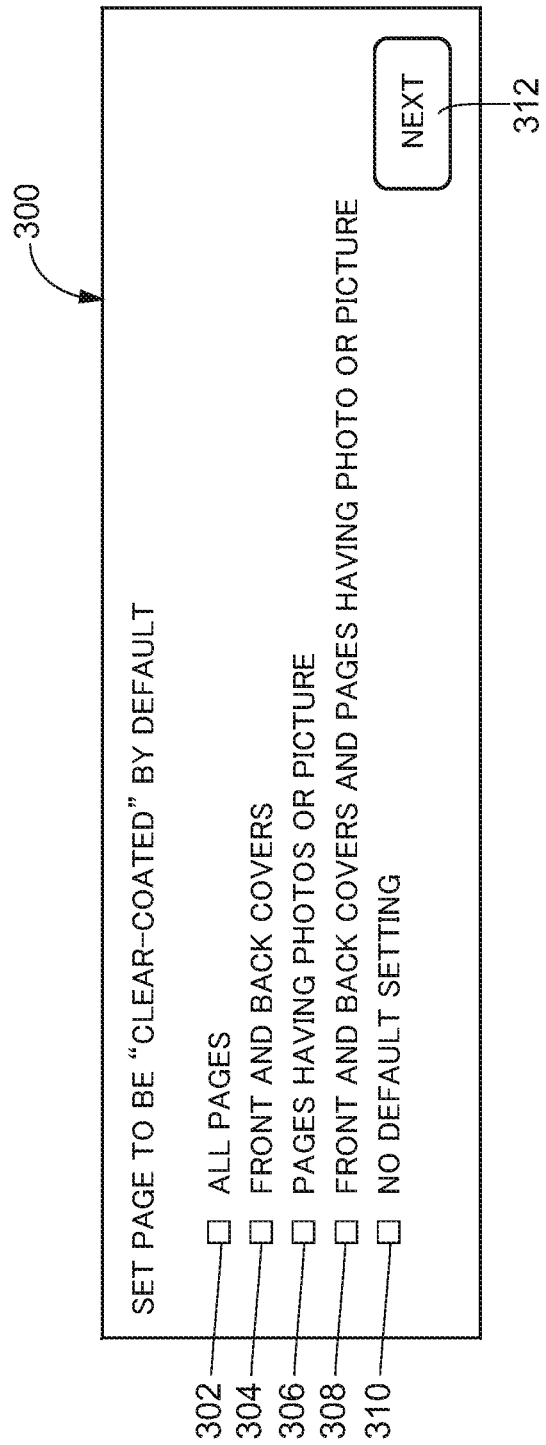
FIG. 4 shows an example of a setting screen image (UI) for setting clear-coating by default.

Referring to FIG. 4, setting screen image 300 is for setting a page or pages to be designated (set) to "clear-coat" by default. Specifically, on setting screen image 300, setting is done for designating beforehand a page or pages to be clear-coated. Setting screen image 300 includes five check boxes 302 to 310 and "NEXT" key 312 to proceed to the next step of processing. When check box 302 is checked by an operation by the user, all pages are set to be designated as the pages to be clear-coated by default. When check box 304 is checked by an operation by the user, the front cover page and the back cover page are set to be designated as the pages to be clear-coated by default. When check box 306 is checked by an operation by the user, a page or pages having a photograph or picture thereon are set to be designated as the pages to be clear-coated by default. When check box 308 is checked by an operation by the user, the front and back cover pages and a page or pages having a photograph or a picture thereon are set to be designated as the pages to be clear-coated by default. When check box 310 is checked by an operation by the user, "NO DEFAULT SETTING" is set. Specifically, in this case, no page is designated as the page to be clear-coated by default. On setting screen image 300, it is possible to select any one of the five check boxes 302 to 310. By such a setting, the pages that the user determined to clear-coat can be designated (set) as the pages to be "clear-coated" by default. Thus, the time and trouble of designating a page or pages to be clear-coated can be saved. When the user operates "NEXT" key 312, the screen image makes a transition to a setting screen image 400 shown in FIG. 5.

Figure 5:
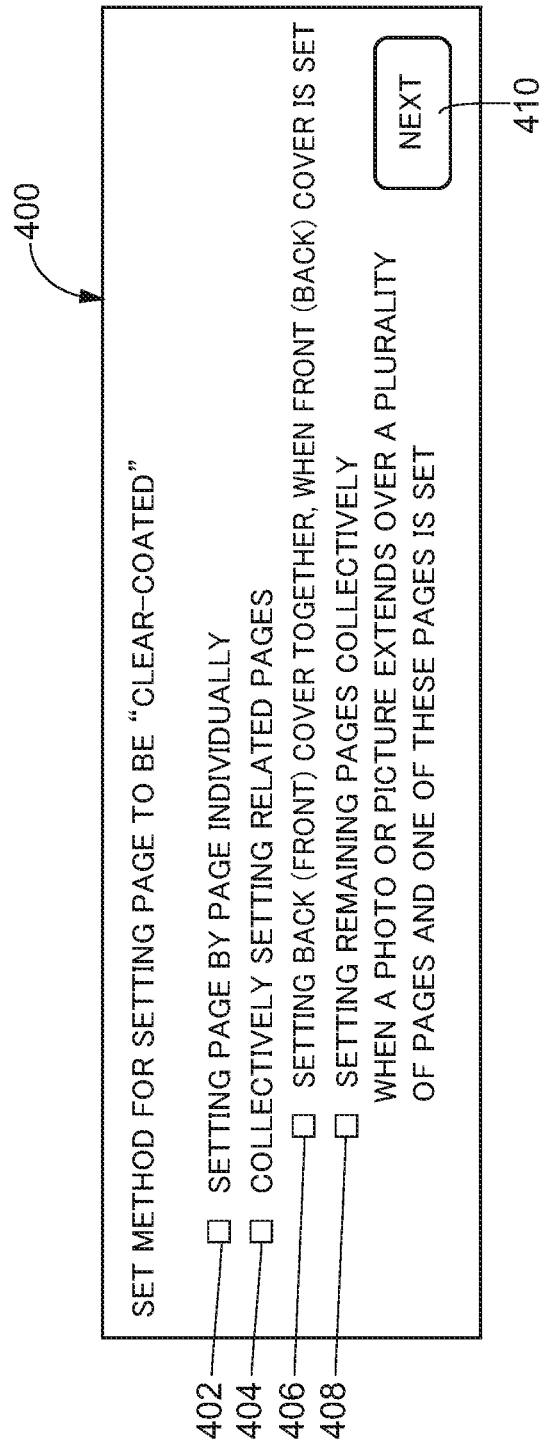
FIG. 5 shows an example of a setting screen image (UI) for setting a method of setting pages to be clear-coated.

Referring to FIG. 5, setting screen image 400 is a screen image for setting the method of setting a page to be clear-coated. Setting screen image 400 includes four check boxes 402 to 408 and "NEXT" key 410 to proceed to the next step of processing. When check box 402 is checked by an operation by the user, the method of setting a page is set to a method of individually setting page by page. When check box 404 is checked by an operation by the user, the method of setting a page is set to a method of collectively setting related pages. It is possible to select either one of check boxes 402 and 404. When check box 404 is checked, control unit 110 requests checking of check box 406 or 408. Check boxes 406 and 408 may both be checked.

When check box 406 is checked by an operation by the user, the method is set to a method of "setting back (front) cover together, when front (back) cover is set." When check box 408 is checked by an operation by the user, the method is set to "setting remaining pages collectively, when a photograph or a picture extends over a plurality of pages and one of these pages is set." By such a setting, when the user sets one page, related pages are set simultaneously, at the time of setting pages to be clear-coated. Thus, time and trouble when setting pages to be clear-coated can be saved. When the user operates "NEXT" key 410, the process at step S1030 shown in FIG. 2 ends.

Again referring to FIG. 2, the program further includes a step S1040, following step S1030, of displaying previews of images (print page images) represented by the print data; and a step S1050, executed following step S1040, of setting the print page to be clear-coated (CC page setting), and ending the program. At step S1040, control unit 110 displays preview screen image having the print page image displayed, on touch-panel display 172.

Figure 6:
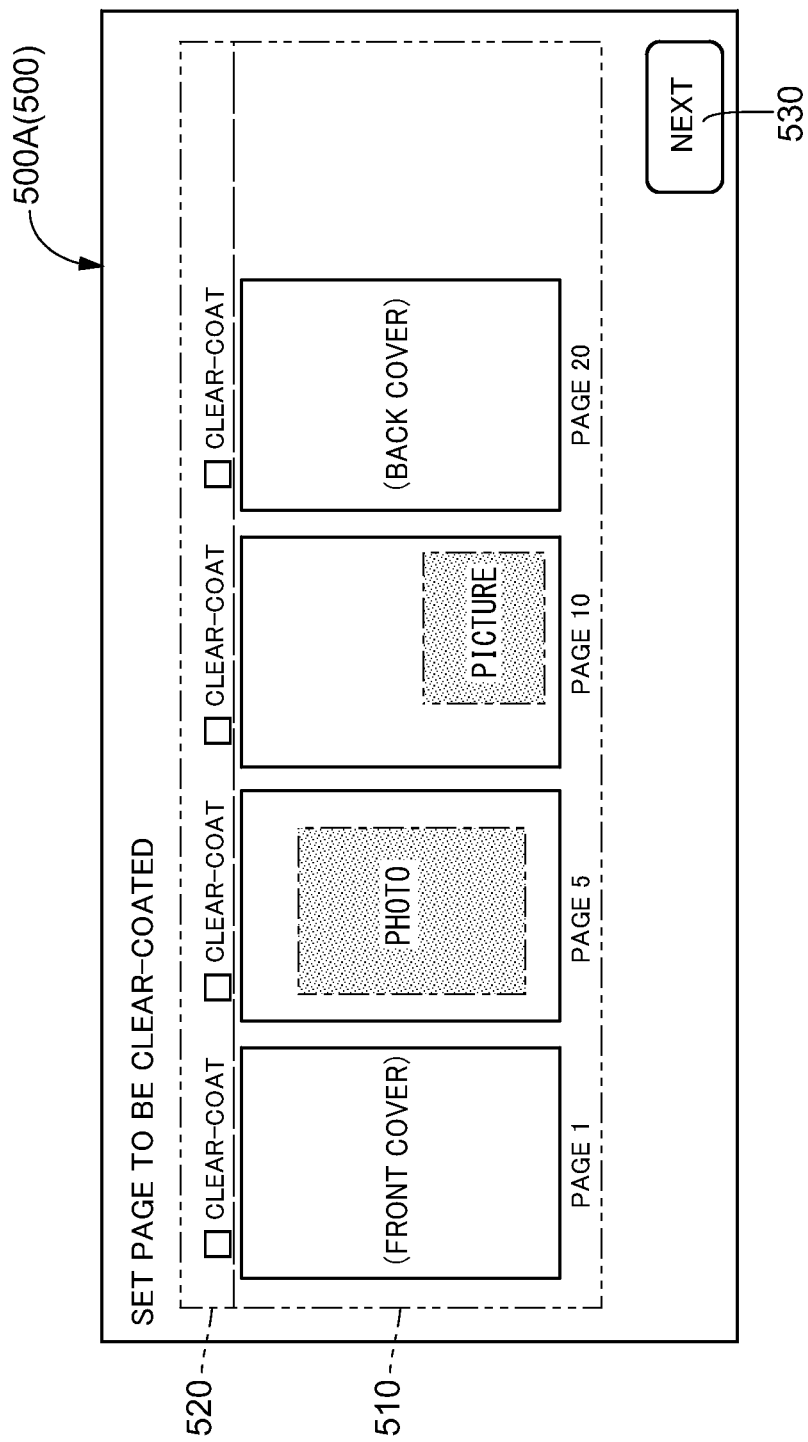
FIG. 6 shows an example of a preview display screen image.

Referring to FIG. 6, preview screen image 500 (500A) includes a preview display area 510 for displaying a preview of print page image; a check box display area 520 for displaying check boxes for checking when a page or pages to be clear-coated is to be designated; and "NEXT" key 530 to proceed to the next step of processing. On an upper side of print page image, a check box is arranged. When the check box is checked, control unit 110 sets the print page corresponding to the checked print page image as the print page to be clear-coated. When the user operates "NEXT" key 530, the setting of pages to be clear-coated ends. It is noted that in FIG. 6, a screen image 500A is shown, in which previews of "front cover page, back cover page and pages having a photograph or picture thereon" are set to be displayed on setting screen image 200 (see FIG. 3).

[Operation]

Image forming apparatus 100 in accordance with the present embodiment operates in the following manner. In the following description, of the operations of image forming apparatus 100, only the portions related to the present invention will be described. Other operations are the same as those of the conventional image forming apparatuses.

Assume that in image forming apparatus 100, when a document is copied and printed, the sheet of recording paper on which the image is formed is set to be clear-coated. When the user sets printing conditions, image forming apparatus 100 receives the input of operation for setting the printing conditions by the user, and sets the printing conditions (step S1000 shown in FIG. 2). When the user presses START key instructing start of the copy and printing (YES at step S1010), image forming apparatus 100 reads the set document image by scanner unit 120 and obtains print data (step S1020). Here, it is assumed that 20 pages of document have been read.

Image forming apparatus 100 displays setting screen image 200 shown in FIG. 3 on touch-panel display 172 of operation panel 170. When the user performs an input operation on setting screen image 200, image forming apparatus 100 sets the page or pages to be previewed in accordance with the input operation by the user. Specifically, referring to FIG. 3, when any of the check boxes 202 to 208 is checked by the user operation, image forming apparatus 100 sets the page of the checked condition as the page to be previewed.

When "NEXT" key 210 on setting screen image 200 is operated by the user, the display of screen image on touch-panel display 172 is changed to setting screen image 300 shown in FIG. 4. When the user performs an input operation on setting screen image 300, image forming apparatus 100 sets the page or pages to be "clear-coated" by default in accordance with the input operation by the user. Specifically, referring to FIG. 4, when any of the check boxes 302 to 308 is checked by the user operation, image forming apparatus 100 sets the page of the checked condition as the page to be "clear-coated" by default. When check box 310 is checked by the user operation, image forming apparatus 100 sets no default setting.

When "NEXT" key 312 on setting screen image 300 is operated by the user, the display of screen image on touch-panel display 172 is changed to setting screen image 400 shown in FIG. 5. When the user performs an input operation on setting screen image 400, image forming apparatus 100 sets the method of setting the page or pages to be "clear-coated" in accordance with the input operation by the user. Referring to FIG. 5, on setting screen image 400, whether pages to be clear-coated are to be set individually page by page or to be collectively set on related pages can be selected.

When "NEXT" key 410 on setting screen image 300 is operated by the user, the process of preview CC page setting (step S1030) shown in FIG. 2 ends, and the preview of an image (print page image) represented by the print data is displayed.

The preview is displayed in accordance with the setting on setting screen image 200 shown in FIG. 3. Referring to FIG. 6, if the "front cover page, back cover page and pages having a photograph or picture put thereon" are set as the pages to be previewed on setting screen image 200 of FIG. 3, preview screen image 500A, for example, is displayed on touch-panel display 172. On preview screen image 500A, only the previews of front cover page, back cover page, and pages having a photograph or picture thereon are displayed. Pages 2 to 4, 6 to 9 and 11 to 19 do not have any photograph or picture and, therefore, previews of these pages are not displayed.

On the preview screen image, when a page or pages to be clear-coated are designated by the user (when clear-coat check box above each print page image is checked), image forming apparatus 100 sets the designated page (page corresponding to the checked print page image) as the page to be clear-coated.

Figure 7:
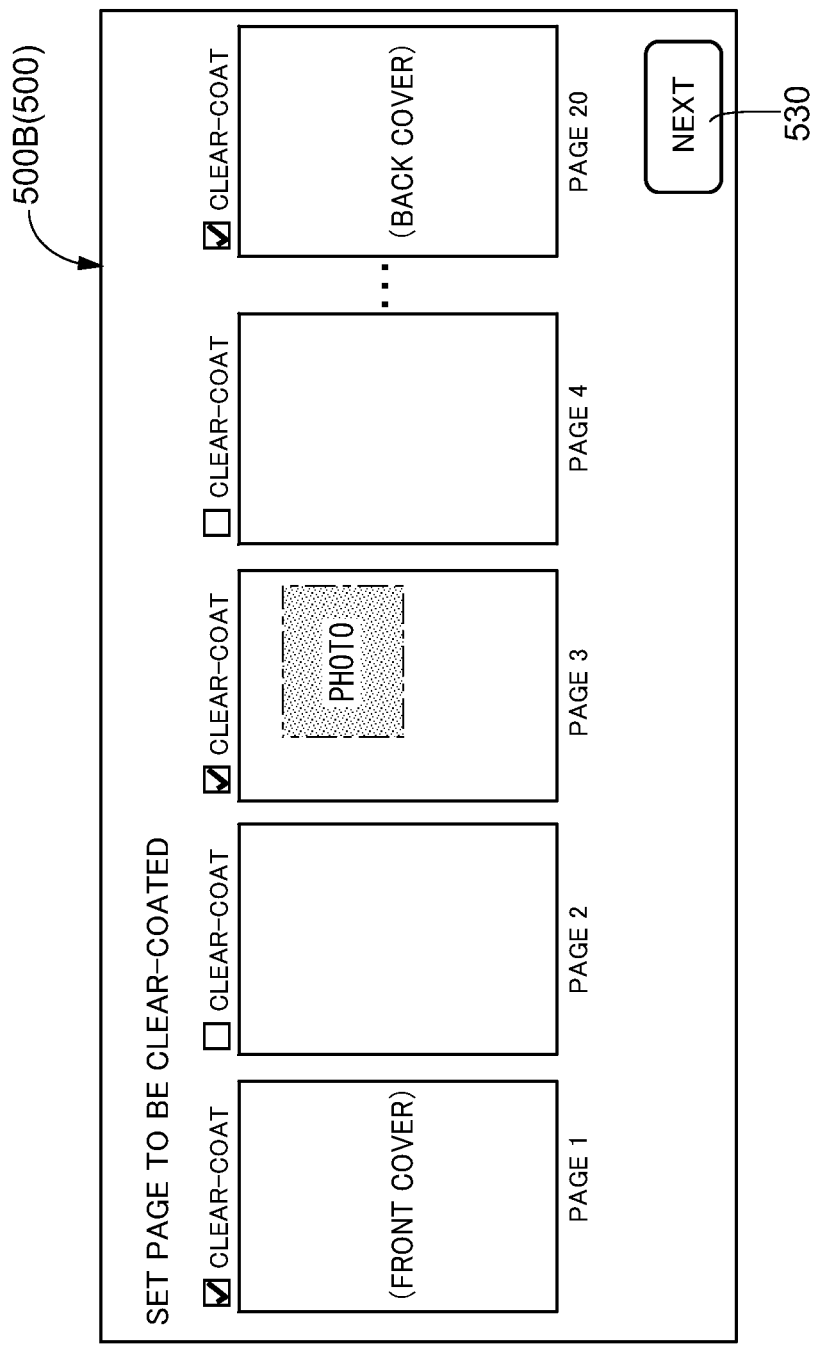
FIG. 7 shows another example of a preview display screen image.

Further, if default setting has been done on setting screen image 300 shown in FIG. 4, the pages to be clear-coated are designated in advance in accordance with the default setting. Specifically, the check boxes of previewed print page images are already checked and set. If the "front cover page, back cover page, and pages having a photograph or picture put thereon" are set to be "clear-coated" by default on setting screen image 300, a preview display screen image 500B (500) shown in FIG. 7, for example, is displayed. Referring to FIG. 7, page 1 is the front cover page and, therefore, it is set to be "clear-coated" by default. Specifically, the clear-coat check box on the upper side has already been checked. Page 20 is the back cover page and, therefore, it is set to be "clear-coated" by default, as does the front cover page. The third page has a photograph and, therefore, this page is also set to be "clear-coated" by default.

Further, if the method of setting is set on setting screen image 400 shown in FIG. 5, when the print page is designated on the preview display screen image, the print page or pages are set in accordance with the set method.

In the following, an example will be described in which "method of collectively setting related pages" is set on setting screen image 400 and, as the specific method, "setting back cover together, when front cover is set" and "setting remaining pages collectively, when a photograph or a picture extends over a plurality of pages and one of these pages is set" are set. On touch-panel display 172, a preview screen image 500C (500) of FIG. 8, for example, is displayed. Preview screen image 500C includes preview images of the front and back cover pages and a plurality of pages (in FIG. 8, 2 pages) on which a photograph extends (pages 2 and 3).

Figure 8:
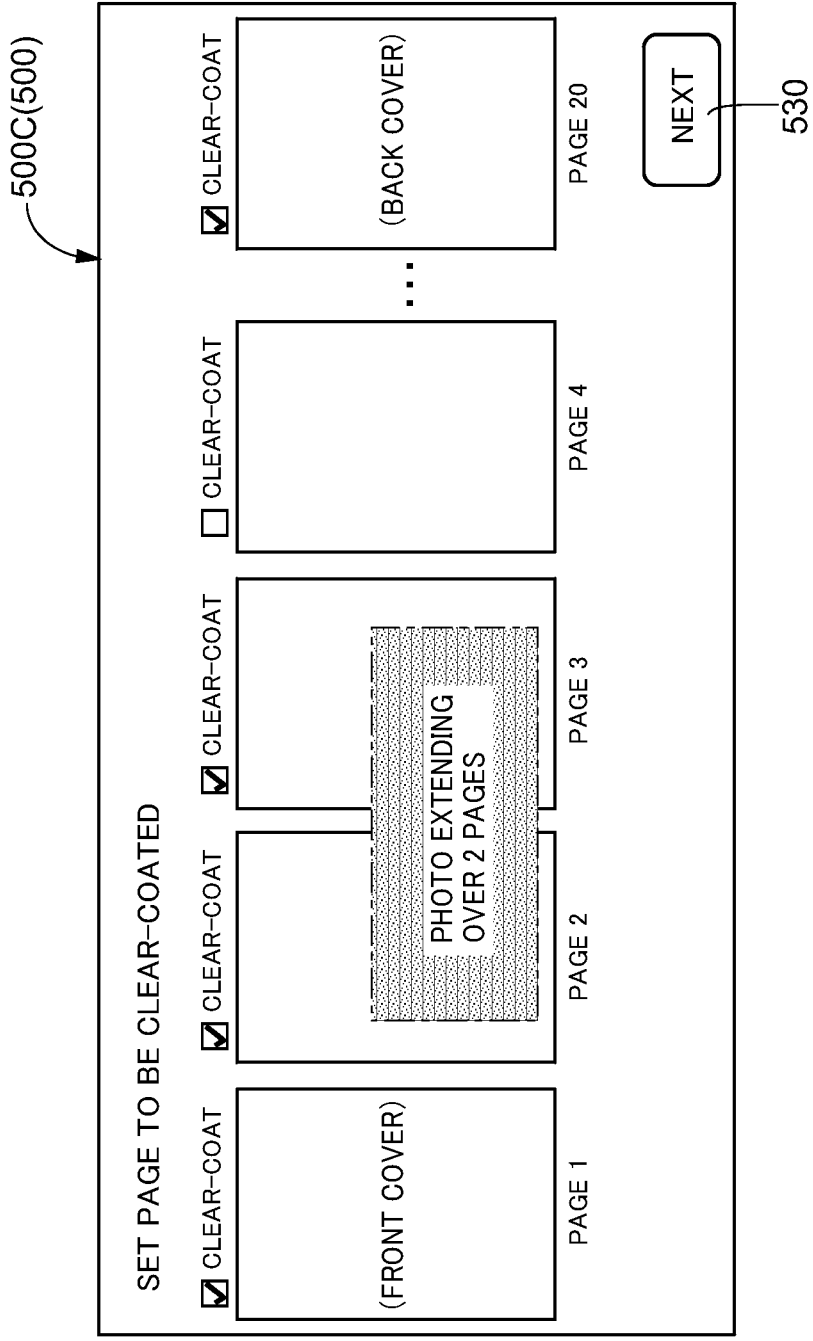
FIG. 8 shows another example of a preview display screen image.

Referring to FIG. 8, when the first page (front cover) is designated (clear-coat check box on the upper side of the print page image is checked) by the user as the page to be clear-coated on preview screen image 500C, in response, image forming apparatus 100 designates the back cover page (last page), which is related to the front page, as the page to be clear-coated (check box is checked). Image forming apparatus 100 sets the designated (checked) front and back cover pages as pages to be clear-coated.

On preview screen image 500C on the second and third pages, a photograph extending over these pages is inserted. When the user designates (checks the check box of) one of these pages (for example, page 2) to be clear-coated, the third page is automatically designated (the check box is checked) as the page to be clear-coated. Image forming apparatus 100 sets the designated (checked) second and third pages as pages to be clear-coated.

In image forming apparatus 100, whether or not an inserted photograph or picture extends over two or more pages is determined in the following manner. First, image forming apparatus performs area separation process on obtained print data, to discriminate a photograph area or picture area of a print page. Next, whether or not a photograph area or picture area is inserted in two or more consecutive pages is determined. If a photograph area or a picture area is inserted in two or more consecutive pages, whether or not the photograph area or the picture area crosses the two or more pages is determined in consideration of layout positions of the photograph or picture area.

When setting of pages to be clear-coated ends, based on the print data read by scanner unit 120, image forming apparatus 100 forms images represented by the print data on sheets of recording paper. Image forming apparatus 100 conveys the sheets of recording paper having the image formed thereon to clear image forming unit 150. Clear image forming unit 150 forms clear images on the sheets of recording paper of the pages set as described above among the conveyed sheets of recording paper. Thus, the sheets of recording paper of the set pages are clear-coated.

[Effects of the Embodiment]

As is apparent from the description above, use of image forming apparatus 100 in accordance with the present invention attains the following effects.

Image forming apparatus 100 displays previews of print page images represented by the print data. Further, image forming apparatus 100 receives designation of print page images of which previews are displayed, and sets the print page or pages corresponding to the designated print page image as the print pages to be clear-coated. The pages to be clear-coated are often limited, for example, to front cover, back cover, and pages having photographs or pictures thereon. By the present image forming apparatus 100, it is possible to set a page to be clear-coated while checking print data images using preview displays on the display means. Therefore, only the suitable pages (such as the front cover, back cover and the pages having photographs or pictures thereon) can easily be set as the pages to be clear-coated.

Further, by the setting on setting screen image 200 (see FIG. 3), image forming apparatus 100 allows preview display of only the specific print page images among a plurality of print page images represented by the print data. By way of example, by displaying only the specific print pages (specific print page images) that are highly likely to be clear-coated as previews, it becomes unnecessary for the user to check pages that are less likely to be clear-coated. In other words, checking of pages not worth considering becomes unnecessary. This efficiently saves time and trouble when setting pages to be clear-coated.

Further, by the default setting on setting screen image 300 (see FIG. 4), image forming apparatus 100 allows designation of specific print page images in advance, among a plurality of print page images represented by the print data. Thus, it is possible to set specific print pages (specific print page images) that are highly likely to be clear-coated as the pages to be clear-coated by default. This more efficiently saves time and trouble when setting pages to be clear-coated.

Preferably, the specific print page images are selected to include at least one of a page image corresponding to the front cover, a page image corresponding to the back cover, a page image having a photograph thereon and a page image having a picture thereon. It is highly likely that these pages are clear-coated. Therefore, as the specific print page images include these page images, it becomes possible to more efficiently save time and trouble when setting pages to be clear-coated.

Further, by the setting of setting method on the setting screen image 400 (see FIG. 5), image forming apparatus 100 allows setting of the method of setting pages, to enable, in response to designation (setting) of one print page (print page image) of a plurality of mutually related pages, collective designation (setting) of remaining pages (print page images) related to the one designated page. Thus, time and trouble when setting pages to be clear-coated can more effectively be saved.

By way of example, the front and back covers are related to each other and, therefore, when the front cover is designated as the page to be clear-coated, the back cover is also automatically designated as the page to be clear-coated. Thus, by setting one page (for example, front cover) as the page to be clear-coated, the related page (for example, back cover) can automatically be set as the page to be clear-coated. Further, if a photograph or a picture extends over a plurality of pages, these consecutive pages are related to each other. In such a situation also, by setting one of these pages as the page to be clear-coated, the remaining pages can also be set as the pages to be clear-coated. Thus, the time and trouble when setting the pages to be clear-coated can efficiently be saved and, in addition, the pages to be clear-coated can surely be set as the pages to be clear-coated. Thus, every single page to be clear-coated can be clear-coated without fail.

(Modifications)

Though an example in which the present invention is applied to an MFP as an example of image forming apparatus has been described above, the present invention is not limited to such an embodiment. The image forming apparatus may be any apparatus other than the MFP, provided that it has the printing function. By way of example, it may be an image forming apparatus such as a copy machine or a printer.

Though an example in which the print page is designated (set) by checking a check box on a preview screen image has been described above, the present invention is not limited to such an embodiment. The page to be clear-coated may be designated (set) by a method other than checking a check box. By way of example, a page to be clear-coated may be designated (set) by touching the print page image of the preview display. In that case, it is preferred that the manner of display of the designated print page image is changed, for example, by highlight.

If the print page is designated (set) by checking a check box on the preview screen image, the method of checking the check box may be touching the check box to directly check the check box, or by touching the preview image (print page image) to check the check box.

In the embodiment above, the method of preview display may be changed in accordance with the setting of printing conditions. Here, for example, a button allowing selection between a finished preview in which previews are displayed in the order of page numbers and a document preview in which previews are displayed with the order of pages arranged for booklet binding when saddle stitch printing is set, may be additionally provided. If the number of pages to be displayed is 8 pages, for example, in the finished preview, the previews are displayed in the order of page 1, page 2, . . . page 7, and page 8. In the document preview, the previews are displayed in the order of page 1, page 8, . . . page 4, and page 5. By providing such a button, the manner of preview can easily be switched between the finished preview and the document preview.

Though an example in which the clear image forming unit is connected following the image forming unit has been described above, the photo receptor drum, laser scanning unit and the like forming the clear image forming unit may be arranged inside the image forming unit and the fixing device may be shared with the image forming device. Specifically, a configuration in which the device for forming a clear image using clear toner is provided inside the image forming apparatus, is also possible. The clear image forming unit may be attached to the outside of the body of image forming apparatus, or it may be attached inside the body of image forming apparatus.

Though an example in which clear-coating is realized by using clear toner has been described above, the present invention is not limited to such an embodiment. By way of example, clear-coating may be realized by using a clear film. The clear film is a coating material in the form of a film, and by fixing it on an area to be coated using heat from a thermal head, the area can be coated.

By way of example, the device for clear-coating using a clear film may be attached to the outside of the body of image forming apparatus. If a device for clear-coating using clear toner is provided inside the body of image forming apparatus and the device for clear-coating using a clear film is attached to the outside of the body of image forming apparatus, one image forming apparatus can have both devices. In that case, these devices may be selectively used in view of the intended use.

Though an example in which the print data is obtained by reading a document image by the scanner unit has been described above, the present invention is not limited to such an embodiment. The print data may be obtained by a different method. For example, the print data may be obtained by receiving print data transmitted from an external device such as an information processing apparatus.

Though an example in which the page to be clear-coated is set by the image forming apparatus has been described above, the present invention is not limited to such an embodiment. By way of example, when the print data is transmitted from an information processing apparatus such as a client computer to the image forming apparatus for printing, the page or pages to be clear-coated may be set by the information processing apparatus. The information processing apparatus may be a tablet type terminal, other than the client computer.

Though an example in which the set page is entirely clear-coated has been described above, the present invention is not limited to such an embodiment. By way of example, when a page having a photograph or a picture thereon is to be clear-coated, only the photograph area or the picture area may be clear-coated.

Though an example in which a preview of two pages over which a photograph extends is displayed has been described, the present invention is not limited to such an embodiment. By way of example, a preview of three or more pages over which a photograph or a picture extends may be displayed.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A setting device setting a print page to be clear-coated, the setting device comprising:
   a display section displaying print page images represented by print data;
   a setting section setting, for each of said print page images represented by said print data, whether a print page corresponding to each print page image is to be clear-coated or not; and
   a designating unit designating in advance a specific print page image among said print page images represented by said print data, said designating unit designating said specific print page image based on a feature of said specific print page image; wherein
   said display section displays an indicator to distinguish that said specific print page image has been designated in advance by said designating unit; and
   said setting section sets a print page corresponding to said specific print page image designated in advance by said designating unit as a print page to be clear-coated.

2. The setting device according to claim 1, further comprising:
   a receiving section receiving designation for a print page image displayed on said display section; wherein
   said setting section further sets a print page corresponding to the print page image of which designation has been received by said receiving section, as a print page to be clear-coated.

3. The setting device according to claim 1, wherein said display section includes a unit for displaying at least one of a page image corresponding to a front cover, a page image corresponding to a back cover, a page image having a photograph put thereon and a page image having a picture put thereon, as said specific print page image.

4. The setting device according to claim 1, wherein said designating unit includes a unit for designating at least one of a page image corresponding to a front cover, a page image corresponding to a back cover, a page image having a photograph put thereon and a page image having a picture put thereon, as said specific print page image.

5. The setting device according to claim 1, wherein
   said print data includes data of a first print page and data of a second print page related to said first print page;
   said setting device further comprising:
   a unit for designating said second print page image related to said first print page image; and
   said setting section sets a print page corresponding to related said second print page image designated by said unit for designating, as a print page to be clear-coated.

6. An image forming apparatus, comprising:
   an image reading device reading a document image to be printed;
   the setting device according to claim 1 for setting a print page to be clear-coated, using print data read by said image reading device;
   an image forming section for forming an image on a paper medium using said print data; and
   a clear coat unit for clear-coating the print page set by said setting device.

7. A clear-coat setting method of setting a print page to be clear-coated, the method comprising the steps of:
   displaying print page images represented by print data;
   setting, for each of said print page images represented by said print data, whether a print page corresponding to each print page image is to be clear-coated; and
   designating in advance a specific print page image based on a feature of said specific print page image, said specific print page image being among said print page images represented by said print data; wherein
   at said displaying step, displaying an indicator to distinguish that said specific print page image has been designated in advance at the designating step; and
   said setting step includes the step of:
   setting a print page corresponding to said specific print page image designated in advance at said designating step as a print page to be clear-coated.

8. The clear-coat setting method according to claim 7, further comprising the steps of:
   displaying a print page image represented by print data;
   receiving designation for the displayed print page image; and
   said setting step includes the step of setting a print page corresponding to the designated print page image as a print page to be clear-coated.

* * * * *